United States Patent
Hasegawa (10) Patent No.: US 8,325,330 B2
(45) Date of Patent: Dec. 4, 2012

(54) OPTICAL FIBRE CIRCUIT MONITORING SYSTEM AND MONITORING DEVICE INCLUDED IN THIS SYSTEM

(75) Inventor: Takemi Hasegawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 272 days.

(21) Appl. No.: 12/920,786

(22) PCT Filed: Dec. 1, 2009

(86) PCT No.: PCT/JP2009/070145
§ 371 (c)(1),
(2), (4) Date: Sep. 2, 2010

(87) PCT Pub. No.: WO2010/067729
PCT Pub. Date: Jun. 17, 2010

(65) Prior Publication Data
US 2011/0001959 A1 Jan. 6, 2011

(30) Foreign Application Priority Data
Dec. 9, 2008 (JP) ................................ 2008-313209

(51) Int. Cl.
*G01N 21/00* (2006.01)

(52) U.S. Cl. ....................................... 356/73.1

(58) Field of Classification Search ......................... None
See application file for complete search history.

(56) References Cited

U.S. PATENT DOCUMENTS 7,177,491 B2 * 2/2007 Dave et al. ...................... 385/11
7,948,614 B2 * 5/2011 Hotate et al. ................. 356/73.1

FOREIGN PATENT DOCUMENTS

| JP | 10-148596 A | 6/1998 |
| JP | 2002-139403 A | 5/2002 |

OTHER PUBLICATIONS

Saida et al., "High-Spatial Resolution Reflectometry by Synthesis of Optical Coherence Function for Measuring Reflectivity Distribution at a Long Distance", IEEE Phontonics Technology Letters, vol. 10, No. 4, 1998, pp. 573-575.
He et al., "Distributed Fiber-Optic Stress-Location Measurement by Arbitrary Shaping of Optical Coherence Function", Journal of Lightwave Technology, vol. 20, No. 9, 2002, pp. 1715-1723.

(Continued)

*Primary Examiner* — Tu Nguyen
(74) *Attorney, Agent, or Firm* — Global IP Counselors, LLP (57) ABSTRACT

Optical fiber lines of a PON system are monitored with a remote fiber test system having a branch-type optical fiber line constituting the PON system and test equipment connected to the branch-type optical fiber line. The test equipment includes a light source, an optical splitter, a detecting part, and a control unit. The light source outputs light having an optical coherence function of a comb shape that is formed as a result of the optical frequency being modulated by a modulation signal of period p. The optical splitter receives light output from the light source and splits the light into probe light and reference light. The detecting part detects interference light that occurs from mutual interference between the reference light and reflected light. Upon detection of the interference light, the detecting part converts the interference light into an electrical signal.

11 Claims, 6 Drawing Sheets

OTHER PUBLICATIONS

Kashiwagi et al., "Remote Long Range Measurement in High Spatial Resolution Reflectometry for Optical Subscriber Networks using Synthesis of Optical Coherence Function", IEICE Technical Report, OPE, 2004, vol. 103, No. 667, pp. 53-58.

Hotate et al., "Synthesis of Optical-Coherence Function and Its Applications in Distributed and Multiplexed Optical Sensing", Journal of Lightwave Technology, vol. 24, No. 7, 2006, pp. 2541-2557.

Enomoto et al., "Optical fiber management and testing system for PON enhanced with identification technologies using a mobile access terminal with a two-dimensional code scanner and fault isolation technologies using high spatial resolution OTDR", Journal of Optical Networking, vol. 6, No. 5, 2007, pp. 408-414.

Notification of the First Office Action of the corresponding Chinese Patent Application No. 200980112051.0, dated Jan. 30, 2012.

* cited by examiner

(a) Direct modulation signal A

(b) External modulation signal B (c) Probe light gate signal C (d) Electrical signal gate signal D

FIG. 3

(a) Correlation between the returned probe light and the reference light

Distance (Delay time)

(b) Overlap of the probe light gate signal and the electrical signal gate signal (Pulse window)

Distance (Delay time)

(c) Sensitivity of detecting the reflected light

Distance (Delay time)

FIG. 4

(a)
Interference signal due to reflected light at the position $Z_1$ (b)
Interference signal due to reflected light at the position $Z_2$

OPTICAL FIBRE CIRCUIT MONITORING SYSTEM AND MONITORING DEVICE INCLUDED IN THIS SYSTEM

TECHNICAL FIELD

The present invention relates to a remote fiber test system for monitoring an optical fiber line by using a reflectometry technique and to test equipment contained in the system.

BACKGROUND ART

In an optical communication system, it is important to detect a trouble such as a damage of an optical fiber line or an increase in the transmission loss. Particularly, in a subscriber optical communication system, the point of the trouble must quickly be detected and restored when a trouble such as breakage or increase of the transmission loss occurs in an optical fiber line or optical network unit. The use of so-called Passive Optical Network (PON) system has recently been spreading in the subscriber optical communication system. In the PON system, the connection between a central office and subscribers are made using a first optical fiber line extending from the central office, optical splitters, and a plurality of branched second optical fiber lines. This helps to decrease the cost incurred per subscriber with respect to the first optical fiber line and optical line terminals installed in the central office.

To detect the above-mentioned troubles in an optical communication system, a remote fiber test system is generally provided. A known remote fiber test system is, for example, the system described in Y. Enomoto et al.: J. Optical Networking, vol. 6 (2007) 408 (Non-patent literature 1). This remote fiber test system consists of optical fiber line test equipment, a reflection filter provided in an optical fiber line, and information on installation such as the position of installed reflection filters, etc.

The optical fiber line test equipment, which utilizes a reflectometry technique, detects the position of a fault on the basis of features such as peaks and level differences in the reflectance distribution of an object under measurement such as an optical fiber line. (In this specification, the "reflected light" means Fresnel reflected light and Rayleigh scattered light, unless otherwise specified in particular.) In the PON system, it is necessary to receive reflected light from a plurality of second optical fiber lines at the same time and to detect the respective features of the reflectance distributions by distinguishing each second optical fiber line. Therefore, it is required that the optical fiber line test equipment be capable of measuring reflectance distributions with high spatial resolution.

A known reflectometry technique is Optical Time Domain Reflectometry (OTDR) for measuring reflectance distributions based on temporal variation in the intensity of reflected light that occurs when pulsed probe light propagates through an object under measurement. To obtain a high spatial resolution with the OTDR, it is necessary to make the pulse width of the probe light to be narrow. Also, it is necessary to increase the power of the probe light so as to compensate for the decrease in the signal to noise ratio (SNR) due to decrease in the energy of the probe light. However, if the power of the probe light is increased, the degradation of measurement performance and the interference in the communication signal will occur because of a nonlinear optical phenomenon such as stimulated Brillouin scattering in the object under measurement. Therefore, in the OTDR, the spatial resolution is limited to about several meters.

Another known reflectometry technique is Optical Coherence Domain Reflectometry (OCDR) (For example, K. Hotate and Z. He: J. Lightw. Technol., vol. 24 (2006) 2541 (Non-patent literature 2), T. Saida and K. Hotate: IEEE Photon. Technol. Lett., vol. 10 (1998) 573 (Non-patent literature 3), Z. He and K. Hotate: J. Lightw. Technol., vol. 20 (2002) 1715 (Non-patent literature 4)). In the OCDR, the reflectance at a specific position in an object under measurement is measured by utilizing the principle that the magnitude of interference between reflected light, which occurs when probe light having a comb-shaped optical coherence function due to modulation of light frequency travels through the object under measurement, and reference light, which is a branched part of the probe light, depends on difference in the delay time between the reflected light and the reference light. Moreover, in the OCDR, the reflectance distribution of the object under measurement is sought, changing the position of reflectance measurement by altering the interval of the light frequency modulation in the probe light, or the like. With the OCDR, a higher spatial resolution can be obtained as compared with the OTDR. In Non-patent literature 2, for example, it is shown that the reflection point located at a distance of 5 km can be measured with a spatial resolution of 19 cm.

The optical coherence function is such that the autocorrelation function $\langle V(t)V^*(t-\tau)\rangle$ of an electric field $V(t)$ of the light that is a function of time t as a variable is normalized with the light intensity and also the Fourier transform of optical power spectrum normalized with the light intensity. When light of electric field $V(t)$ is split into two and the delay time difference between these two split light is $\tau$, the magnitude of the interference fringe of these two split light is represented by the real part of the optical coherence function of the light. Also, the absolute value of the optical coherence function is called a degree of coherence, and shows the magnitude of the interference.

Probe light used in the OCDR is, for example, light in which the light frequency is modulated at constant time intervals in a manner such as in the order of $f_0$, $f_0+f_s$, $f_0-f_s$, $f_0+2f_s$, $f_0-2f_s$, $f_0+3f_s$, $f_0-3f_s$, . . . , or light in which the light frequency is modulated with the modulation frequency $f_s$ in a form of sine wave. The optical coherence function of the probe light in which the light frequency is modulated in such manner has peaks (coherence peaks) having a shape similar to a delta function when $f_s\tau$ is an integer. That is, these probe light have a comb-shaped optical coherence function. When $f_s$ changes, the position of coherence peaks also changes.

The comb-shaped optical coherence function has a plurality of coherence peaks arranged at an interval $1/f_s$. By means of restriction made by a gate with a time width that is shorter than the interval $1/f_s$ of arrangement of the coherence peaks, a pulse of the probe light is cut out so that one of the coherence peaks may exist in the measurement section of the object under measurement.

Non-patent literature 2 describes a technique with which the distance range that can be measured according to the OCDR is expanded. In the technique, light having an optical coherence function including a number of comb-like coherence peaks is generated by periodical frequency modulation of a light source, and by pulsing the generated light, an optical coherence function having a single coherence peak is made. Moreover, the delay time is made coincident with the coherence time of the light source either by altering the delay time of the reference light by switching the delay fiber that is provided in the reference optical path, or by causing the reference light to propagate through a loop circuit including a delay line. In such manner, it is made possible to measure a long distance range on the order of km.

Also, Non-patent literature 3 refers to a technique for expanding the distance range that can be measured with the OCDR. In this technique, the measurement distance range is expanded by choosing a light frequency modulation period so that the coherence peak of the optical coherence function may exist in a distance range that exceeds the coherence length of the output light of a light source. It is mentioned that by way of example the reflected light occurring at a distant point of about 5 km can be measured by forming coherence peaks at about 1 km intervals by a frequency modulation performed at a modulation period of 100 kHz±10 kHz for the light source having a coherence length of 60 m.

CITATION LIST

Non-Patent Literature

Non-patent literature 1. Y. Enomoto et al.: J. Optical Networking, vol. 6 (2007) 408.
Non-patent literature 2. K. Hotate and Z. He: J. Lightw. Technol., vol. 24 (2006) 2541.
Non-patent literature 3. T. Saida and K. Hotate: IEEE Photon. Technol. Lett., vol. 10 (1998) 573.
Non-patent literature 4. Z. He and K. Hotate: J. Lightw. Technol., vol. 20 (2002) 1715.

SUMMARY OF INVENTION

Technical Problem

The object of the present invention is to provide a remote fiber test system and test equipment with a practical structure that enables monitoring optical fiber lines of a PON system.

Solution To Problem

To achieve the object, provided is a remote fiber test system which comprises: a first optical fiber line having two ends; a plurality of second optical fiber lines each having two ends; a branch-type optical fiber line including a first optical splitter that connects a first end of the first optical fiber line to a first end of each of the plurality of second optical fiber lines; and test equipment connected to a second end of the first optical fiber line. In this system, the test equipment comprises a light source, a second optical splitter, a detecting part, and a control unit. The light source outputs light having an optical coherence function of a comb shape which is formed as a result of the optical frequency being modulated by a modulation signal of period p. The second optical splitter receives light output from the light source and outputs the light, splitting into probe light and reference light. The detecting part detects interference light that occurs from mutual interference between reflected light and reference light, the reflected light arising while the probe light output from the second optical splitter propagates through the branch-type optical fiber line, and the reference light being output from the second optical splitter. And, upon detection of the interference light, the detecting part converts the interference light into an electrical signal and outputs it. The control unit changes the period p, and on the basis of the period p and the electrical signal output from the detecting part, obtains reflectance distribution along the direction of the probe light propagation in the branch-type optical fiber line.

At least one of the plurality of second optical fiber lines may have a reflecting part, and the test equipment may further include a storage means in which information on the distance between the reflecting part and the test equipment is stored. The test equipment preferably detects, at spatial resolution of 9 cm or less, the probe light that is reflected at the reflecting part. Also, a plurality of reflecting parts are wavelength-selective reflectors which reflect probe light, and reflectance [dB] of the reflector is preferably larger than $-40+20 \log_{10} N$, where N is the number of branches in the first optical splitter.

The test equipment may further comprise a probe light gate which receives probe light output from the second optical splitter and selectively outputs the probe light for a period of first gate width w1 at a constant period T. And, the detecting part may output electrical signals corresponding to the intensity of interference light generated by interference between reflected light and reference light selectively during a period of second gate width w2 at the constant period T through a specific frequency band, the reflected light occurring while the probe light output from the probe light gate propagates through the optical fiber line, the reference light being output from the second optical splitter. In this case, the detecting part may include a photoelectric converter which outputs an electrical signal having a value corresponding to the intensity of the interference light, and an electric signal gate which receives electrical signals output from the photoelectric converter and outputs the electrical signals selectively during a period of second gate width w2 at a constant period T. It is preferable that the period p, the first gate width w1 and the second gate width w2 satisfy the relationship w1+w2<2p, and it is also preferable that the specific frequency band in the detecting part do not include the frequency that is m/p, wherein m is an arbitrary integer.

Provided as another embodiment of the invention is test equipment which tests an optical fiber line and comprises a light source, an optical coupler, a probe light gate, a detecting part, and a control unit. The light source outputs light having a comb-shaped optical coherence function in which the optical frequency is modulated with a modulation signal of period p. The optical coupler receives light output from the light source, and outputs the light, splitting into probe light and reference light. The probe light gate receives the probe light output from the optical coupler, and outputs the probe light selectively during a period of first gate width w1 at a constant period T. The detecting part outputs electrical signals corresponding to the intensity of interference light arising from mutual interference between reflected light, which occurs while the probe light output from the probe light gate propagates through the optical fiber line, and reference light, which is output from the second optical splitter selectively during a period of second gate width w2 at the constant period T through a specific frequency band. The control unit changes the period p, and on the basis of the period p and the electrical signal output from the detecting part, obtains reflectance distribution along the direction of the probe light propagation in the optical fiber line.

The detecting part may include a photoelectric converter which outputs an electrical signal having a value corresponding to the intensity of the interference light, and an electric signal gate which receives electrical signals output from the photoelectric converter and outputs the electrical signals selectively during a period of second gate width w2 at a constant period T. It is preferable that the period p, the first gate width w1 and the second gate width w2 satisfy the relationship w1+w2<2p. It is also preferable that the specific frequency band in the detecting part do not include the frequency that is m/p, wherein m is an arbitrary integer.

BRIEF DESCRIPTION OF DRAWINGS

In FIG. 2, regions (a), (b), (c), and (d) are graphs showing the waveforms of direct modulation signal A, external modulation signal B, probe light gate signal C, and electrical signal gate signal D, respectively.

In FIG. 3, region (a) is a graph showing the correlation between the reflected light and the reference light, region (b) is a graph showing the overlap of the probe light gate signal C and the electrical signal gate signal D, and region (c) is a graph showing the sensitivity of detecting the reflected light.

In FIG. 4, region (a) is a graph showing the spectrum of an interference signal due to light reflected from the position $z_1$ where the correlation between reflected light and reference light is high, and region (b) is a graph showing the spectrum of an interference signal due to light reflected from the position $z_2$ where the correlation between the reflected light and the reference light is low.

FIG. 5 includes magnified graphs showing the part surrounded by a broken line in region (a) of FIG. 4: region (a) shows a case where the respective period T of the gate signal D and the gate signal C is an integer multiple of the period p of direct modulation signal A; region (b) shows a case where the respective period T of the gate signal D and the gate signal C is not an integer multiple of the period p of direct modulation signal A.

DESCRIPTION OF EMBODIMENTS

The conventional remote fiber test systems, including those described in Non-patent literatures 1 to 4, have been difficult to apply as a monitoring system for an optical fiber line in a subscriber PON system. The reason for such difficulty is as follows.

First, as for the remote fiber test system described in Non-patent literature 1, the spatial resolution was as low as 2 m, since it used the OTDR for its test equipment. Consequently, there was a problem that the reflection peaks could not be distinguished as they overlapped with each other when the distances from the test equipment to the respective reflection filters differ from each other only by 2 m or less among a plurality of second optical fiber lines. Also, if it was attempted to evade this problem by making the installation such that the lengths of the second optical fiber lines differ from each other by 2 m or more, it was necessary to prepare a space for housing the excess length of maximum 2 m, which made it difficult to accomplish the installation in a condominium or the like where there was little room for such a space.

Second, the expansion of measurable distance range was a problem to be solved in the case where the OCDR technique is applied to the test equipment. Generally, the line length of the optical fiber line is about 1 to 20 km in the subscriber optical communication system, and therefore it is necessary to expand the measurable distance as in the techniques described in Non-patent literatures 2 and 3.

However, in the method described in Non-patent literature 2, the light output from a light source is pulsed, the reference light is caused to propagate through a reference light path that includes a loop circuit (delay fiber), where delay fibers are switched as needed; therefore it is necessary to prepare delay fibers at a larger number than the ratio of (measurable distance range)/(coherence length). Also, the delay fiber must have a long length that is equivalent to the length of an optical fiber line under measurement. Therefore, the large number of delay fibers thus required will make the test equipment to be large-sized and high-cost, which will result in lessened practicality.

Also, in the method described in Non-patent literature 2, an optical amplifier is needed to compensate the loss of reference light when it propagates through a loop circuit. Therefore, the wavelength of light output from the light source is limited to the wavelength that allows optical amplification by an optical amplifier. On the other hand, in an actual subscriber optical communication system, light having a wavelength of 1.26 µm to 1.62 µm is used for the communication, and probe light must have a wavelength other than such wavelength. Also, with a single mode fiber based on ITU-TG.652 that is widely used for applications in actual optical communication systems, light having a wavelength shorter than 1.26 µm is unsuitable for application in testing because of the influence of high order mode, whereas light having a wavelength longer than 1.7 µm is unsuitable for testing because of the bend loss. Therefore, it is preferable to use light having a wavelength of 1.62 µm to 1.7 µm, but it is difficult to achieve a delay line loop circuit with such light because such wavelength band is unsuitable for a general optical amplifier such as an Er-doped fiber amplifier (EDFA).

In the technique described in Non-patent literature 3, the light output from the light source is not pulsed; therefore a plurality of coherence peaks of the optical coherence function exist in a measurable distance range. Consequently, the position of a reflection point cannot be determined since light reflected from a plurality of positions is collectively detected.

Should light output from the light source be pulsed in combination of the methods described in Non-patent literatures 2 and 3, it might be possible to limit the coherence peak of the optical coherence function to one. However, it would be impossible to measure a wide distance range because the order of the coherence peak (the ratio of the delay time difference to modulation period) is constant.

Hereinafter, preferred embodiments of the present invention will be described in reference to the accompanying drawings. The drawings are provided for the purpose of explaining the embodiments and are not intended to limit the scope of the invention. In the drawings, an identical mark represents the same element so that the repetition of explanation may be omitted.

Embodiment 1

Figure 1:
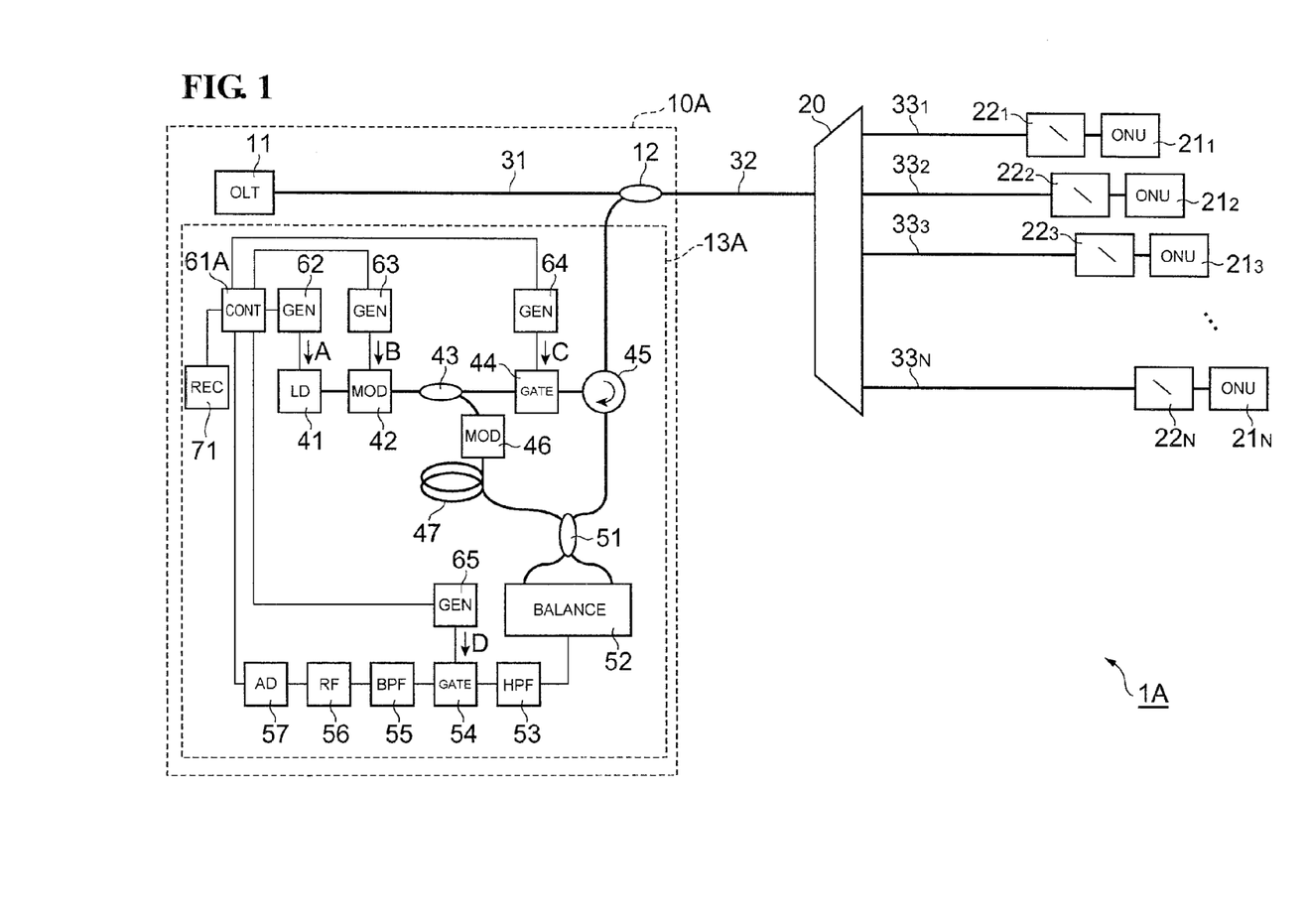
FIG. 1 is a conceptual schematic diagram showing a remote fiber test system equipped with optical fiber line test equipment relating to Embodiment 1 of the present invention.

FIG. 1 is a conceptual schematic diagram showing a remote fiber test system 1A equipped with optical fiber line test equipment 13A relating to Embodiment 1 of the present invention. The remote fiber test system 1A, in which an optical line terminal (OLT) 11 provided in a central office 10A and N-number of optical network units (ONU) $21_1$ to $21_N$ are optically connected mutually through an optical splitter 20 and optical fiber lines, is used for making optical communication between the optical line terminal 11 and each optical network unit $21_n$. Here, N is an integer that is equal to or more than 2, and n is each integer that is one or more and N or less. The configuration of the remote fiber test system 1A is called Passive Optical Network (PON). Typically, the branching number N is 4 to 32.

The central office 10A is equipped with a multiplexer 12 and optical fiber line test equipment 13A, in addition to the optical line terminal 11. The optical line terminal 11 and the multiplexer 12 are optically connected through an optical fiber line 31. And, the multiplexer 12 is optically connected with the optical fiber line test equipment 13A. The multiplexer 12 and the optical splitter 20 are optically connected through a first optical fiber line 32. The optical splitter 20 and each optical network unit 21$_n$ are optically connected through a second optical fiber line 33$_n$.

The first optical fiber line and the second optical fiber line are preferably composed of single-mode optical fibers based on ITU-T G.652. Preferably, an optical filter 22$_n$ which reflects probe light and allows communication light to pass is arranged on each second optical fiber line 33$_n$ at a position near the optical network unit 21$_n$. It is preferable to use probe light of 1.65 μm band (1.64 to 1.66 μm) since light having a wavelength of 1.26 tam to 1.62 μm is generally used as the communication light. Therefore, the optical filter is preferably a filter capable of selectively reflecting the light of 1.65 μm band. Such an optical filter can be obtained by means of fiber grating or the like.

The optical fiber line test equipment 13A tests objects under measurement (first optical fiber line 32, optical splitter 20, second optical fiber line 33$_n$, optical filter 22$_n$, optical network unit 21$_n$) by conducting the OCDR measurement. The optical fiber line test equipment 13A is equipped with a light source 41, an intensity modulator 42, an optical splitter 43, a probe light gate 44, an optical circulator 45, a polarization modulator 46, a delay optical fiber 47, a combiner 51, a balanced detector 52, a first filter 53, an electric signal gate 54, a second filter 55, an RF detector 56, an AD converter 57, a control unit 61A, and signal generators 62 to 65.

The light source 41, which is capable of modulating the optical frequency of output light, is a semiconductor DFB laser source or a semiconductor laser source having an external resonator, for example. The light source 41 receives periodic direct modulation signal A that is output from the signal generator 62, and outputs light the optical frequency of which is modulated periodically according to the direct modulation signal A. The light output from the light source 41 has a comb-shaped optical coherence function.

The intensity modulator 42 receives periodic external modulation signal B output from the signal generator 63, and based on the external modulation signal B, modulates the intensity of light output from the light source 41, and outputs the light thus modulated. The external modulation signal B is a periodic signal which is synchronized with the direct modulation signal A. The light output from the intensity modulator 42 becomes light in which the optical spectrum is modified by intensity modulation and the noise included in the optical coherence function is reduced.

The optical splitter 43 receives light that has been output from the light source 41 and modulated by the intensity modulator 42 as needed, and splits the light into two, that is, probe light and reference light, outputting the probe light to the probe light gate 44 and outputting the reference light to the polarization modulator 46.

The probe light gate 44 receives the probe light output from the optical splitter 43 and also receives probe light gate signal C output from the signal generator 64. The probe light gate signal C is a periodic signal having a pulse of a gate width w1 at the constant period T. The gate width w1 is approximately equal to the modulation period of the direct modulation signal A. The probe light gate 44 outputs probe light, which is output from the optical splitter 43, toward the optical circulator 45 only at the period of pulse of the gate width w1.

The optical circulator 45 receives probe light output in a pulsed state from the probe light gate 44, and outputs the probe light to the multiplexer 12. The optical circulator 45 also receives light that has arrived from the multiplexer 12, and outputs the light to the combiner 51.

The probe light output from the optical circulator 45 is launched to the first optical fiber line 32 via the multiplexer 12, and reaches the optical filter 22$_n$ via the first optical fiber line 32, the optical splitter 20, and the second optical fiber line 33$_n$. The reflected light (Fresnel reflected light or Rayleigh scattered light) that occurs during the propagation of the probe light travels along the propagation path that is opposite to the propagation direction of the probe light and is put into the combiner 51 via the multiplexer 12 and the optical circulator 45. In such case, since the optical filter 22$_n$ is arranged on each second optical fiber line 33$_n$ at a position near the optical network unit 21$_n$, the power of the reflected light increases, and accordingly the SN ratio of the OCDR measurement is improved, and consequently the measurement time is reduced, which is desirable.

Particularly, it is preferable that the reflectance R of the optical filter satisfies:

$$R > R_0 + 20 \log_{10} N$$

where N is the splitting number of the optical splitters. Here, $R_0$, which is an internal reflectance in the optical circulator, the multiplexer 12, the first optical fiber line, and the optical splitter, is typically −40 dB. By satisfying the above equation, the reflected light that is reflected at the optical filter and reaches the test equipment has a power that is larger than the power of the reflected light that occurs from an unintentional reflection at a position upstream (on the side of the test equipment) of the optical splitter. Therefore, the influence of the noise due to the unintentional reflection occurring upstream of the optical splitter is relatively reduced, and the measurement time is reduced.

It is preferable that the delay optical fiber 47 be provided on the optical path of the reference light between the optical splitter 43 and the combiner 51. The delay optical fiber 47 sets the delay time between reflected light (return light of the probe light), which is input to the combiner 51 from the optical circulator 45, and reference light, which is input to the combiner 51 from the optical splitter 43. Preferably, the length of the delay optical fiber 47 is set so that the delay time between the reference light and the reflected light occurring as a result of the probe light being reflected at an arbitrary position within the distance range under measurement may become longer than the coherence time of the output light of the light source 41. By setting the delay time as described above, the variation of spatial resolution in the measurement range can be reduced, since the spatial resolution value becomes substantially constant in the range where the delay time is longer than the coherence time. (Incidentally, in the range where the delay time is shorter than the coherence time, the spatial resolution becomes lower as the delay time increases.)

It is also preferable that the polarization modulator 46 is provided on the optical path of the reference light between the optical splitter 43 and the combiner 51. The polarization modulator 46 receives the reference light output from the optical splitter 43, and outputs the reference light after changing the polarization state thereof. In the case of detecting light due to interference between reflected light and reference light, it is preferable to conduct the measurement while changing the polarization state of the reference light and to perform data processing such as averaging with respect to the measurement results obtained under a plurality of polarization conditions, and thereby to obtain the results of measurement that do not depend on the polarization state. The polarization modulator may be provided such that the polarization state is changed on the side of the reflected light, instead of the reference light.

The combiner 51 receives the reflected light output from the optical circulator 45 as well as the reference light output from the optical splitter 43, and outputs the reflected light and the reference light to the balanced detector 52 after combining them. For example, a 3-dB coupler is used as the combiner 51.

The balanced detector 52 receives the reflected light and the reference light that have been combined by the combiner 51, and outputs to the first filter 53 the electrical signal which shows the intensity of interference light occurring from the overlap of the reflected light and the reference light. That is, the balanced detector 52 functions as a photoelectric converter which outputs an electrical signal with a value according to the intensity of the interference light.

The first filter 53 receives an electrical signal output from the balanced detector 52, and outputs the electrical signal to the electric signal gate 54 after removing the unnecessary noise contained in the electrical signal. The first filter 53 is preferably a filter that removes the direct current component of the input electrical signal. The noise of the direct current component occurs according to an error of balance in the combiner 51 and the balanced detector. And, by removing the noise by the first filter 53, noise occurrence in the electric signal gate 54 at a latter part can be reduced.

The electric signal gate 54 receives the electrical signal gate signal D that has been output from the signal generator 65, as well as the electrical signal that has passed through the first filter 53. The electrical signal gate signal D is a periodic signal having pulses with the gate width w2 at the constant period T. The period T of the electrical signal gate signal D is equal to the period T of the probe light gate signal C. The pulse center of the electrical signal gate signal D is delayed with respect to the pulse center of the probe light gate signal C by the gate delay time d.

The electrical signal that has been output from the first filter 53 is output by the electric signal gate 54 to the second filter 55 just for a pulse period of the gate width w2. The electrical signal output from the electric signal gate 54 to the second filter 55 becomes a pulsed signal. An operational amplifier circuit that performs an ON/OFF function according to the level of the electrical signal gate signal D is used as the electric signal gate 54.

The second filter 55 receives pulsed electrical signals output from the electric signal gate 54 and selectively outputs an electrical signal having a specific frequency band to the RF detector 56. Preferably, the above-mentioned specific frequency band at the second filter 55 does not include a frequency of (n is a natural number) that is an integer multiple of repetition frequency f (=1/T) of the electrical signal gate signal D. Particularly, it is preferable that the above specific frequency band have a bandwidth of f/2 or less including a frequency of half-integer multiple of f (=1/T). The signal that is input to the electric signal gate 54 has a noise in the direct current and the frequency of an integer multiple of 1/p, and as a result of this noise passing through the electric signal gate, the noise scatters to the frequencies of integer multiple of f However, by setting the frequency band as described above, the influence of noise that occurs at the electric signal gate 54 can be reduced, and accordingly the SN ratio for measurement can be improved, which results in reduction of the measurement time.

The RF detector 56 receives an electrical signal output from the second filter 55, and converts it into an electrical signal that is equivalent to the magnitude of interference component, and then outputs the so-converted electrical signal to the AD converter 57. The AD converter 57 receives the electrical signal output from the RF detector 56, changes this electrical signal (analog signal) into a digital signal, and outputs the digital signal to the control unit 61A. The value of this digital signal shows the power of reflected light that has occurred at a position z on the optical fiber line as determined by the period p of the optical frequency modulation at the light source 41 and the gate delay time d.

The control unit 61A receives the digital value output from the AD converter 57, and stores this digital value and the position z, associating them with each other. By controlling each of the signal generators 62 to 65, the control unit 61A specifies the modulation period p of the direct modulation signal A output from the signal generator 62, the modulation period (p over an integer) of the external modulation signal B output from the signal generator 63, the period T and gate width w1 of the probe light gate signal C output from the signal generator 64, the period T and gate width w2 of the probe light gate signal D output from the signal generator 65, and the gate delay time d. Thus, the control unit 61A specifies the measurement position z on the optical fiber line that is a measurement object, and obtains from the AD converter 57 the digital value that shows the power of the reflected light occurring at the position z. Then, the control unit 61A obtains the reflectance distribution of the optical fiber line along the propagation direction of the probe light.

Also, the control unit 61A is connected with a storage means 71. The storage means 71 stores information such as the distance between the test equipment and each optical filter $22_n$, the building name, and the installation position in the building relating to each optical filter and the position of each optical network unit. In reference to information prepared beforehand on a distance to optical filter $22_n$ and the distance obtained from a reflectance peak in the reflectance distribution, the control unit 61A judges whether or not reflected light from each optical filter $22_n$ has been detected. Then, if there is an optical network unit for which no reflected light is detected, the control unit 61A displays an abnormality judging that a malfunction such as a breakage exists on the optical fiber that belongs to the optical network unit. Moreover, in the control unit 61A, an OCDR measurement is done limiting to the vicinity of the optical filter on the basis of the information regarding the distance to the optical filter, and thereby detecting the existence or non-existence of reflected light from the optical filter and the magnitude of the reflectance, it is possible to quickly examine the existence or non-existence of the abnormality of a second optical fiber line to which the optical filter belongs.

Next, using FIGS. 2 to 5, an explanation will be given with respect to a direct modulation signal A which is given to the light source 41 from the signal generator 62, an external modulation signal B which is given to the intensity modulator 42 from the signal generator 63, a probe light gate signal C which is given to the probe light gate 44 from the signal generator 64, an electrical signal gate signal D which is given to the electric signal gate 54 from the signal generator 65, an electrical signal which is output from an RF detector 56, etc.

Figure 2:
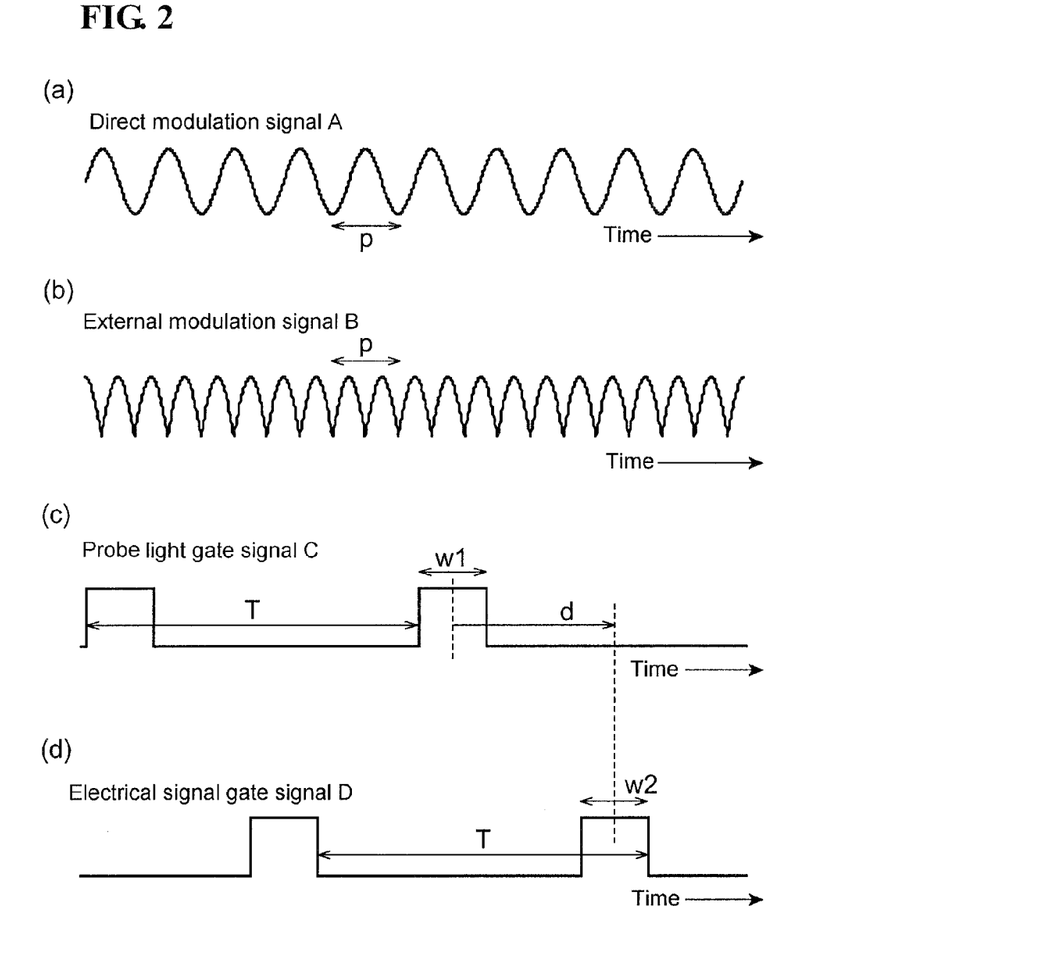
Figure 3:
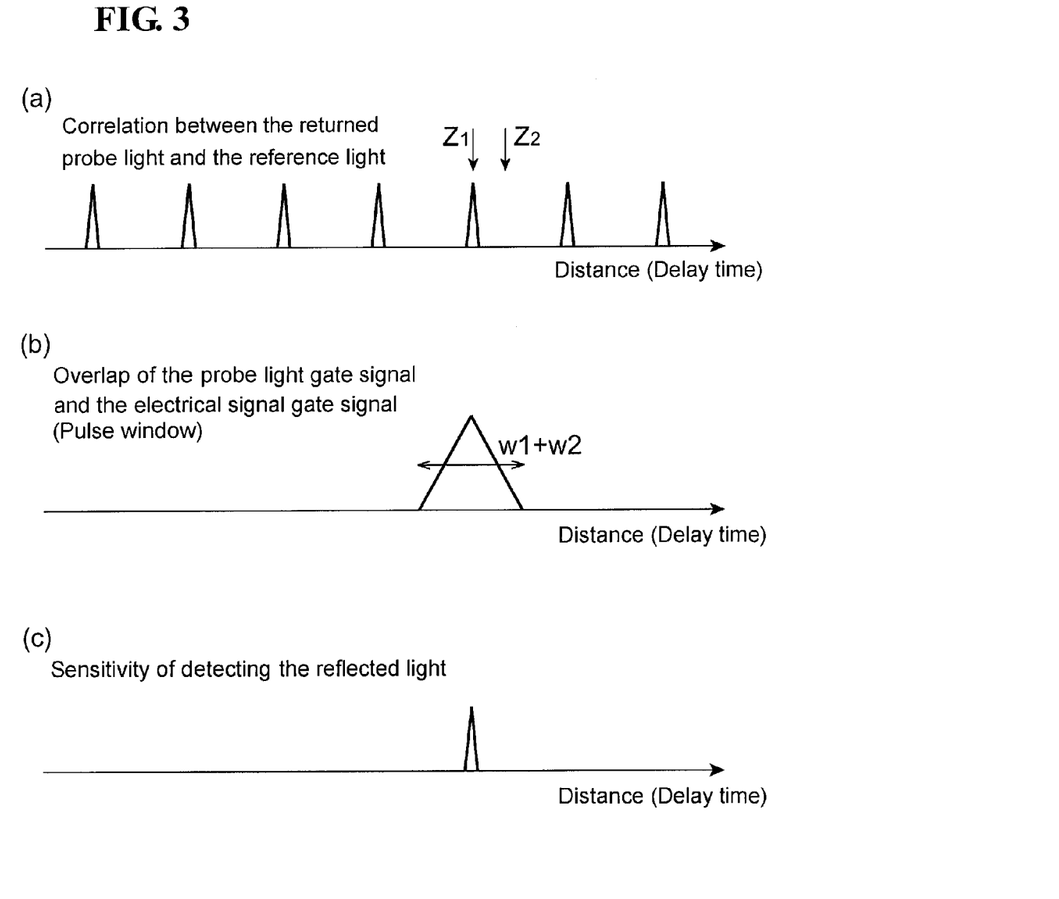

Regions (a), (b), (c) and (d) of FIG. 2 are graphs showing the waveforms of direct modulation signal A, external modulation signal B, probe light gate signal C, and electrical signal gate signal D, respectively. In FIG. 3, region (a) is a graph showing the correlation between the reflected light and the reference light, region (b) is a graph showing an overlap (pulse window) of the probe light gate signal C and the electrical signal gate signal D, and region (c) is a graph showing the sensitivity of detecting the reflected light.

As shown in the region (a) of FIG. 2, the direct modulation signal A is a signal having a period p and is a signal for modulating the optical frequency of light output from the light source 41. The period p defines the measurement position z on the optical fiber line. When the delay time difference τ relative to the reference light of the reflected light (returned probe light) which has occurred as a result of reflection and scattering at the position z of an optical fiber line under measurement satisfies the condition of Equation (1):

$$\tau/p = \text{integer} \quad (1),$$

the phase of modulation of the reflected light and that of the reference light synchronize, and the correlation between the reflected light and the reference light increases (the position $z_1$ in the region (a) of FIG. 3). On the other hand, in the reflected light that has occurred from reflection and scattering at the position which does not satisfy the condition of Equation (1), the correlation with the reference light is low (the position $z_2$ in the region (a) of FIG. 3).

Figure 4:
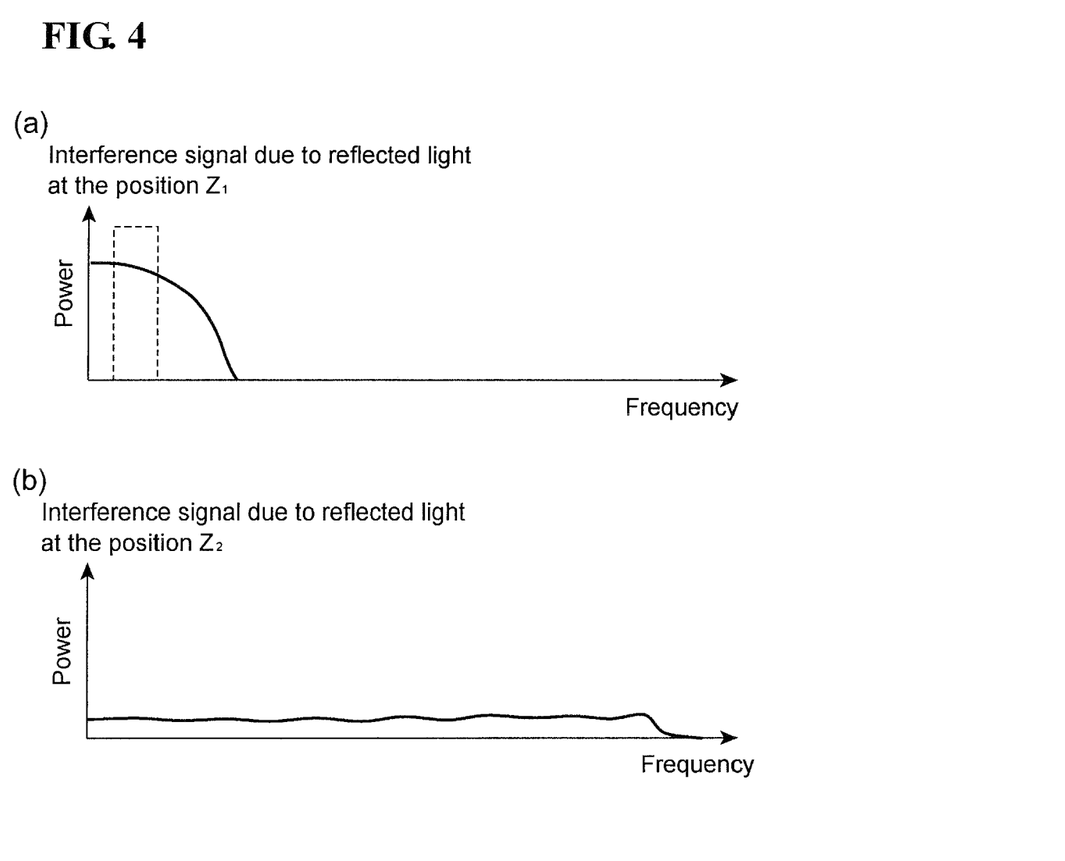

In FIG. 4, the region (a) is a graph showing the spectrum of an interference signal due to light reflected from the position $z_1$ where the correlation between reflected light and reference light is high, and the region (b) is a graph showing the spectrum of an interference signal due to light reflected from the position $z_2$ where the correlation between the reflected light and the reference light is low. When the correlation between the reflected light and the reference light is high, the spectrum of the interference signal due to the reflected light and the reference light localizes in a frequency band that is substantially the same as the frequency width of the probe light. On the other hand, when the correlation is low, the spectrum of the interference signal is spread over the frequency band that is substantially the same as the deviation of frequency modulation of the probe light. Therefore, by providing the optical frequency modulation at a modulation frequency that is greater than the linewidth of the probe light, it is made possible to selectively detect reflected light from a specific measurement position.

Since the spatial resolution is approximately inversely proportional to the deviation of optical frequency modulation, the greater the deviation of the frequency modulation is, the better. On the other hand, the upper limit value of the electric current that can be put into a laser diode as the light source 41 is determined by the damage threshold, and the lower limit value is zero, whereby the upper limit of the deviation is restricted. The waveform of the direct modulation signal A is a sine wave according to the present embodiment; however, it may be a periodic wave, such as a rectangular wave, a triangular wave, or the like.

More preferably, the spatial resolution should preferably be 9 cm or less. In such case, to avoid the overlap of the reflection peaks of optical filters that belong to different second optical fiber lines, it is sufficient if the lengths of the second optical fiber lines are made to mutually differ by 9 cm or more, and each second optical fiber line is ensured to have an excess length of 9 cm. For the purpose of the second optical fiber line, of single mode optical fibers according to ITU-T G.652, generally used is an optical fiber in which the bending characteristic is enhanced to have an allowable bending radius of 15 mm. Since the excess length of 9 cm can be housed by winding one turn with this allowable bending radius of 15 mm, it is possible to minimize the space of housing the excess length by making the spatial resolution equal to or less than 9 cm.

The external modulation signal B is a periodic signal which is synchronized with the direct modulation signal A, and is a signal for modulating the intensity of output light from the light source 41 by means of the intensity modulator 42 in synchronization with the direct modulation signal A (the region (b) of FIG. 2). With this, the spectrum of light output from the intensity modulator 42 can be modified. The reflected light detection sensitivity in the OCDR is expressed as a function of distance, and the function of distance is known as an optical coherence function. To selectively detect light reflected from a specific measurement position, the optical coherence function should preferably be close to an array of delta functions. Since the optical coherence function is given by the Fourier transform of the power spectrum of light, the positional selectivity in the reflected light measurement by the OCDR can be enhanced by modifying the spectrum by intensity modulation.

The probe light gate signal C is a periodic signal having a pulse with a gate width w1 at a constant period T, and is a signal with which the probe light output from the probe light gate 44 is selected only for the pulse period of the gate width w1 (the region (c) of FIG. 2). Also, the electrical signal gate signal D is a periodic signal having a pulse with gate width w2 at a constant period T, and is a signal with which an electrical signal output from the electric signal gate 54 is selected only for the pulse period of the gate width w2 (the region (d) of FIG. 2).

The period T of the electrical signal gate signal D is equal to the period T of the probe light gate signal C. The pulse center of the electrical signal gate signal D is delayed just by the gate delay time d relative to the pulse center of the probe light gate signal C. In this manner, the reflected light from a specific measurement distance range (pulse window) in an optical fiber line is selectively detected (the regions (b) and (c) of FIG. 3).

It is preferable that the period p of the direct modulation signal A, the gate width w1 of the probe light gate signal C, and the gate width w2 of the electrical signal gate signal D satisfy the relationship of Equation (2):

$$w1+w2<2p \quad (2).$$

By doing so, the correlation peak that can exist in the pulse window is limited to one if the gate delay time d is set so that the correlation between the reflected light and the reference light may exhibit its peak at the center of the pulse window.

Note that it is assumed in Equation (2) that the delay of ON/OFF operation of the probe light gate 44 relative to the level variation of the probe light gate signal C, the delay of ON/OFF operation of the electric signal gate 54 relative to the level variation of the electrical signal gate signal D, the propagation delay of the signals such as the probe light gate signal C and the electrical signal gate signal D, the propagation delay of light, etc. in the equipment are negligible. In case these delays cannot be ignored, it can be managed if the gate delay time d is increased or decreased accordingly.

In the case where Equation (4) is satisfied:

$$w1+w2>2p \quad (4),$$

the correlation between the reflected light and the reference light exhibits its peak at two or more positions in the pulse window, and a cross-talk of reflected light measurement occurs between these positions, which is undesirable. Also, when Equation (5) is satisfied:

$$w1+w2<0.5p \quad (5),$$

the SN ratio of measurement decreases because of the degradation of pulse energy, which is undesirable. Therefore, it is preferable that Equation (6) be satisfied:

$$0.5p<w1+w2<2p \quad (6).$$

It is preferable that the respective period T of the probe light gate signal C and the electrical signal gate signal D be an integer multiple of period p of the direct modulation signal A. Preferably, the pass band of the second filter 55 does not include any frequency that is an integer multiple of the respective repetition frequency f (=1/T) of the probe light gate signal C and the electrical signal gate signal D. For example, it is preferable that Equation (7) be satisfied:

$$\frac{n+0.1}{T} < \text{(the lower limit of passband)} < \text{(the upper limit of passband)} < \frac{n+0.9}{T}, \quad (7)$$

where n is an integer.

This is due to the following reasons. The electrical signal (electric current I1) that is output from the balanced detector 52 is expressed by Equation (8) when the proportional coefficient is omitted:

$$I1 = \epsilon(|E1|^2 + |E2|^2) + 2Re(E1 \times E2^*) \quad (8),$$

where E1 is the complex amplitude of electric field of the reflected light that is put into the balanced detector 52, and E2 is the complex amplitude of electric field of the reference light that is put into the balanced detector 52. The first term of this equation is an incoherent noise. The letter $\epsilon$ represents the attenuation coefficient of a common-mode component by the balanced detection. It is ideal that $\epsilon$ be zero. Actually, however, it is often the case that $\epsilon$ is $10^{-5}$ or more, which is a cause of the noise. The second term is an interference signal.

The incoherent noise is proportional to the light intensity, and has spectral components including a direct current component that is equivalent to the average power and a modulated component (period p) that is made by concomitant intensity modulation in the light source 41 and an external intensity modulation. As for the incoherent noise, a pulse is cut out by the electrical signal gate signal D at the electric signal gate 54 after the attenuation of the direct current component is done by the first filter 53.

The electrical signal (electric current I2) output from the electric signal gate 54 is expressed by Equation (9):

$$I2 = \epsilon F(|E1|^2 + |E2|^2) + 2F\, Re(E1 \times E2^*) \quad (9).$$

Figure 5:
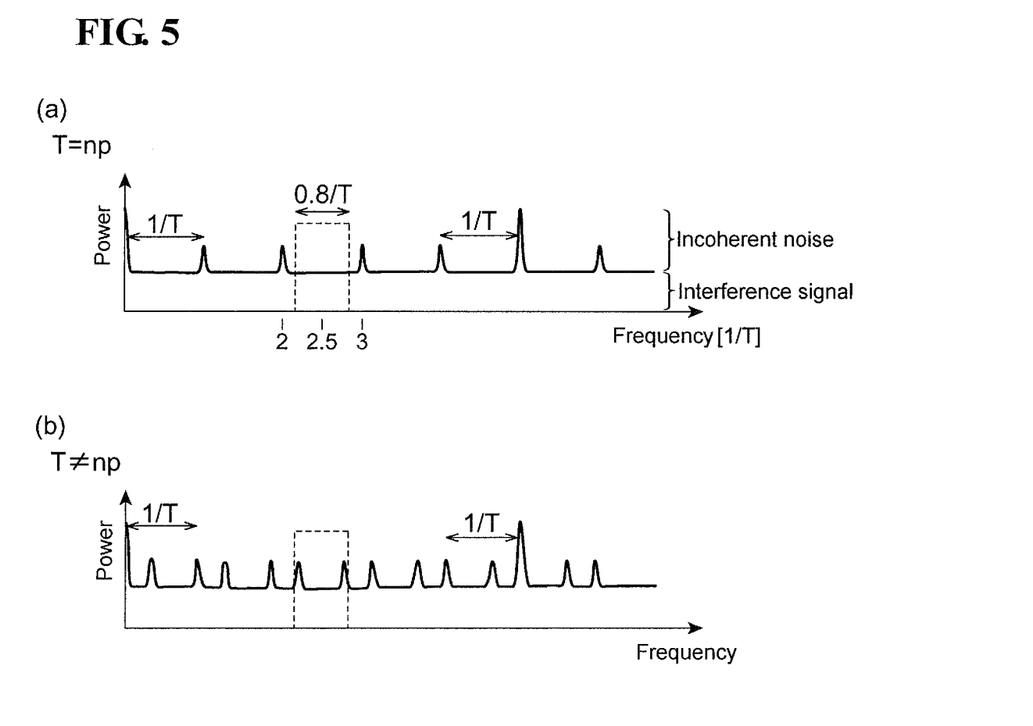

Here, F is the electrical signal gate signal D and has a period T. The first term of this equation is an incoherent noise and the second term is an interference signal. The incoherent noise of the first term is a product of the function of frequency (1/p) and the function of frequency (1/T), and therefore it becomes a noise that arises at frequency (i/p+j/T), where each of i and j is an integer (FIG. 5, region (b)). Here, if the pulse period is set so that the respective pulse repetition period T of the probe light gate signal C and the electrical signal gate signal D may become equal to an integer multiple of modulation period p of the direct modulation signal A, the frequency at which the incoherent noise occurs is limited to i/T, where i is an integer (FIG. 5, region (a)).

Accordingly, measurement results with less noise can be obtained if a detection band is set by taking out a component of frequency band that does not include the frequency (i/T) by means of the second filter 55. Therefore, preferably the pass band of the second optical filter 55 should satisfy Equation (7). Also, it is preferable that the pass band of the second optical filter 55 include frequency (m+0.5)/T that is a half-integer multiple of the pulse repetition, since the frequency (m+0.5)/T is particularly distanced from a peak of noise, exhibiting a low noise.

Embodiment 2

Figure 6:
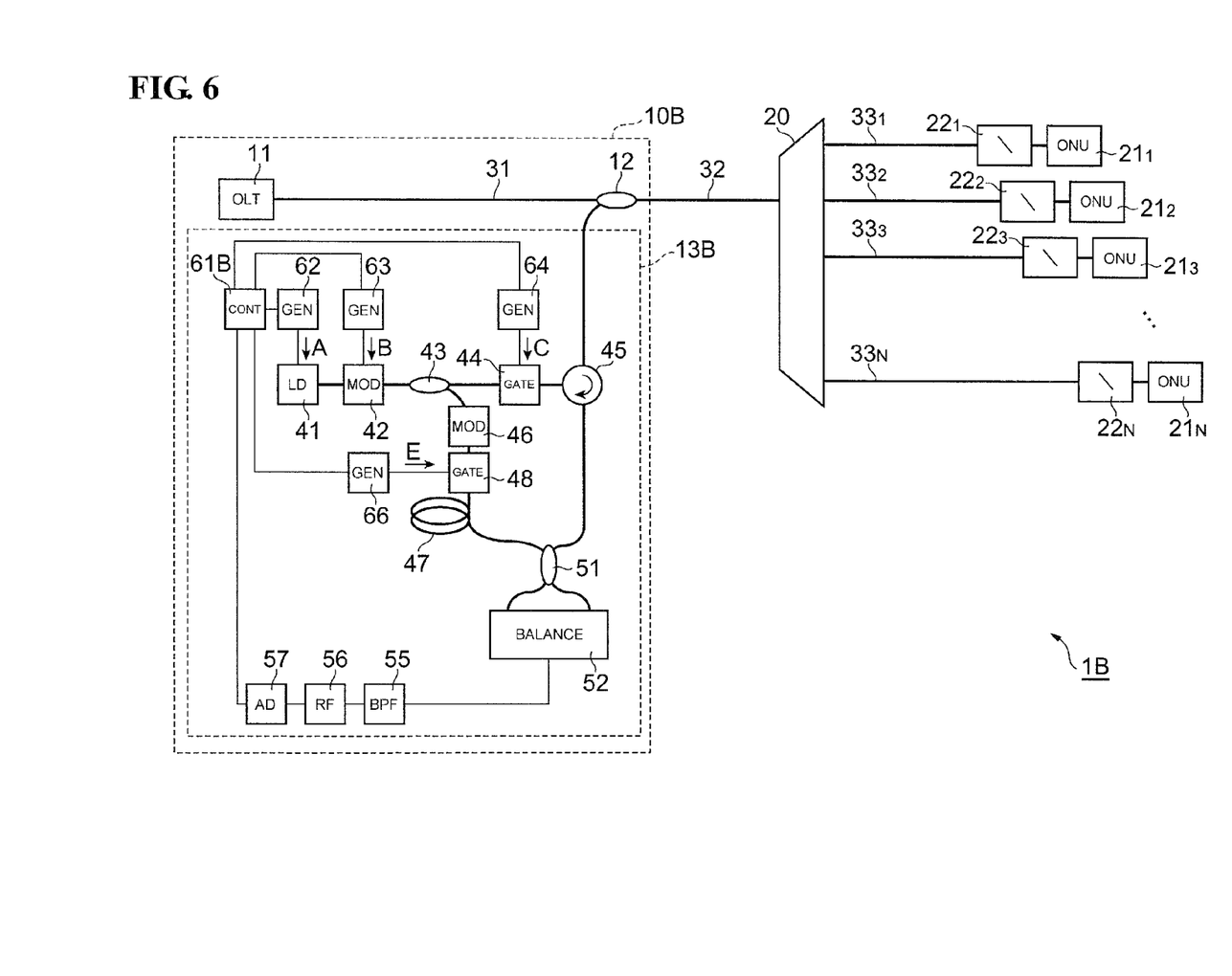
FIG. 6 is a conceptual schematic diagram showing a remote fiber test system equipped with optical fiber line test equipment relating to Embodiment 2 of the present invention.

FIG. 6 is a conceptual schematic diagram showing a remote fiber test system 1B equipped with optical fiber line test equipment 13B relating to Embodiment 2 of the present invention. The remote fiber test system 1B differs from the remote fiber test system 1A in that the remote fiber test system 1B is not equipped with the first filter 53, the electric signal gate 54, and the signal generator 65, and that it is equipped with a reference light gate 48, a signal generator 66, and a control unit 61B instead of the control unit 61A.

The reference light gate 48 is provided on the optical path of the reference light between the optical splitter 43 and the combiner 51. The reference light gate 48 receives the reference light output from the optical splitter 43, and also receives the reference light gate signal E output from the signal generator 66. The reference light gate signal E is similar to the electrical signal gate signal D of Embodiment 1, and is a periodic signal that has a pulse with a gate width w2 at a constant period T. The period T of the reference light gate signal E is equal to the period T of the probe light gate signal C. The pulse center of the reference light gate signal E is delayed by just a gate delay time d relative to the pulse center of the probe light gate signal C. The reference light gate 48 allows the reference light to pass from the optical splitter 43 to the combiner 51 for the pulse period of the gate width w2 of the reference light gate signal E.

The balanced detector 52 receives the reflected light (returned probe light) and reference light that are combined by the combiner 51, and outputs toward the second filter 55 the electrical signal showing the intensity of the interference light arising from the interference of these reflected light and reference light. The second filter 55 receives pulsed electrical signals output from the balanced detector 52, and selectively outputs the electrical signals having the specific frequency band to the RF detector 56. The AD converter 57 receives an electrical signal (analog signal) output from the RF detector 56, and convert the electrical signal into a digital signal, outputting the digital signal to the control unit 61B.

The control unit 61B receives a digital value output from the AD converter 57, and stores the digital value and the position z, interrelating them. By controlling each of the signal generators 62, 63, 64, and 66, the control unit 61B specifies the modulation period p of the direct modulation signal A that is output from the signal generator 62, the modulation period of the external modulation signal B that is output from the signal generator 63 (p over integer), the period T and gate width w1 of the probe light gate signal C that is output from the signal generator 64, the period T and gate width w2 of the reference light gate signal E that is output from the signal generator 66, and the gate delay time d. Thus, the control unit 61B specifies the measurement position z on the optical fiber line under measurement, and obtains from the AD converter 57 the digital value indicating the power of the reflected light that has occurred at the position z. Then, the control unit 61B obtains the reflectance distribution of the optical fiber line along the direction of the probe light propagation.

In the optical fiber line test equipment 13A, the balanced detector 52 detects light caused by mutual interference between the reference light that is continuous light and the reflected light (return light of probe light), and thereafter the interference signal (output voltage signal from the balanced detector 52) is cut out in a pulse form by means of the electric signal gate 54 that is an electric switch, and thereby the measurement position of the optical fiber line under measurement is limited to the pulse window. Thus, the measurement without a cross talk can be achieved. On the other hand, with the optical fiber line test equipment 13B, the measurement without a cross talk can similarly be achieved by limiting measurement position to the pulse window in a manner such that the reference light gate 48 provided on the optical path of the reference light is operated by the reference light gate signal E so that the reference light is cut out in a pulse form.

The optical fiber line test equipment 13B is advantageous in that its electric circuit is simplified as compared with the optical fiber line test equipment 13A. On the other hand, in the optical fiber line test equipment 13A, the direct current component of the incoherent noise can be attenuated by the first filter 53, and accordingly the incoherent noise that occurs due to the product of the direct current component and the electrical signal gate signal D is less as compared with the optical fiber line test equipment 13B. Therefore, there is less possibility that the noise might occur because of the skirt of the noise peak lying over the detection band that is set so as to avoid the peak of the incoherent noise, and accordingly the reliability of the measurement is high. Also, the optical fiber line test equipment 13A can be achieved at a low cost, since the use of an optical gate that is generally of high-cost than an electrical switch can be reduced as compared with the optical fiber line test equipment 13B.

With the remote fiber test system and the optical fiber line test equipment relating to the present invention, an optical fiber line can be monitored by a practical structure with high spatial resolution over a wide measurable distance range.

INDUSTRIAL APPLICABILITY

The remote fiber test system and the optical fiber line test equipment relating to the present invention can be used for monitoring optical fiber lines of a PON system.

The invention claimed is:

1. A remote fiber test system comprising:
a first optical fiber line having two ends;
a plurality of second optical fiber lines each having two ends;
a branch-type optical fiber line including a first optical splitter connecting a first end of the first optical fiber line to a first end of each of the plurality of second optical fiber lines; and
test equipment connected to a second end of the first optical fiber line, the test equipment comprising a light source, a second optical splitter, a detecting part, a control unit, and a probe light gate that receives probe light output from the second optical splitter and outputs the probe light selectively during a period of first gate width w1 at a constant period T,
wherein the light source outputs light having a comb-shaped optical coherence function formed by means of modulation of optical frequency by a modulation signal of period p, and the second optical splitter receives light output from the light source and outputs the light, splitting into probe light and reference light, and the detecting part detects interference light and converts the interference light into an electrical signal so as to output, the interference light occurring from mutual interference between reflected light and reference light, the reflected light arising while the probe light output from the second optical splitter propagates through the branch-type optical fiber line, the reference light being output from the second optical splitter, and the control unit changes the period p and, on the basis of the period p and the electrical signal output from the detecting part, obtains reflectance distribution along the direction of the probe light propagation in the branch-type optical fiber line, and wherein the detecting part outputs electrical signals corresponding to the intensity of interference light arising from mutual interference between reflected light and reference light selectively during a period of second gate width w2 at the constant period T through a specific frequency band, the reflected light occurring when the probe light output from the probe light gate propagates through the optical fiber line, the reference light being output from the second optical splitter.

2. A remote fiber test system according to claim 1, wherein at least one of the plurality of second optical fiber lines has a reflecting part, and the test equipment further comprises a storage means storing information on the distance between the reflecting part and the test equipment.

3. A remote fiber test system according to claim 2, wherein the test equipment detects, at spatial resolution of 9 cm or less, probe light reflected at the reflecting part.

4. A remote fiber test system according to claim 2, wherein a plurality of reflecting parts are wavelength-selective reflectors to reflect probe light, and reflectance [dB] of the reflector is larger than $-40+20 \log_{10} N$, where N is the number of branches in the first optical splitter.

5. A remote fiber test system according to claim 1, wherein the detecting part comprises: a photoelectric converter that outputs an electrical signal having a value corresponding to the intensity of the interference light; and an electric signal gate that receive electrical signals output from the photoelectric converter and outputs the electrical signals selectively during a period of second gate width w2 at a constant period T.

6. A remote fiber test system according to claim 1, wherein the period p, the first gate width w1, and the second gate width w2 satisfy the relationship $w1+w2<2p$.

7. A remote fiber test system according to claim 1, wherein the specific frequency band in the detecting part does not include the frequency of m/p, wherein m is an arbitrary integer.

8. Test equipment that tests an optical fiber line, the equipment comprising a light source, an optical coupler, a probe light gate, a detecting part, and a control unit, wherein
the light source outputs light having an optical frequency modulated with a modulation signal of period p and a comb-shaped optical coherence function,
the optical coupler receives light output from the light source and outputs the light, splitting into probe light and reference light,
the probe light gate receives the probe light output from the optical coupler and outputs the probe light selectively during a period of first gate width w1 at a constant period T,
the detecting part outputs electrical signals corresponding to the intensity of interference light arising from mutual interference between reflected light and reference light selectively during a period of second gate width w2 at the constant period T through a specific frequency band, the reflected light occurring while the probe light output from the probe light gate propagates through the optical fiber line, the reference light being output from the second optical splitter, and
the control unit changes the period p and, on the basis of the period p and the electrical signal output from the detecting part, obtains reflectance distribution along the direction of the probe light propagation in the optical fiber line.

9. Test equipment according to claim 8, wherein the detecting part comprises a photoelectric converter and an electric signal gate, the photoelectric converter outputting an electrical signal having a value corresponding to the intensity of the interference light, the electric signal gate receiving electrical signals output from the photoelectric converter and outputting the electrical signals selectively during a period of second gate width w2 at a constant period T.

10. Test equipment according to claim 8, wherein the period p, the first gate width w1, and the second gate width w2 satisfy the relationship w1+w2<2p.

11. Test equipment according to claim 8, wherein the specific frequency band in the detecting part does not include the frequency that is m/p, wherein m is an arbitrary integer.

* * * * *